3,298,855
MOISTURE-RESISTANT WRAPPING PAPER
Arthur F. Helin and Gerald J. Mantell, Kansas City, Mo., assignors, by mesne assignments, to Gulf Oil Corporation, Pittsburgh, Pa., a corporation of Pennsylvania
Filed July 23, 1962, Ser. No. 211,489
8 Claims. (Cl. 117—76)

This application is a continuation-in-part of copending application Serial No. 131,159, filed August 14, 1961, and now abandoned.

This invention relates to coated papers and to methods of making the same. In particular, this invention relates to papers coated with an ethylene polymer and certain rubbery film-forming thermoplastic polymers.

Papers coated within a thin extruded film of an ethylene polymer have been used in the packaging field as moisture-resistant wrappings, either to retain moisture within a package or to exclude moisture from a package whose contents are to remain dry. However, wrapping materials of this sort are expensive because of the low rate of production which is required and because of the cost of the relatively thick extruded ethylene polymer film and of the equipment for its application to a paper substrate. In consequence, the art has sought other means of applying ethylene polymer to paper.

The formation of an ethylene polymer film on a paper substrate by deposition of ethylene polymer solids from an aqueous emulsion has been explored. However, the ethylene polymer emulsions available to the art until only recently have had undesirable esthetic properties, particularly color and odor, which made them objectionable for use in wrapping materials.

French Patents 1,295,895 and 1,295,982 describe the preparation of new, stable, non-ionically emulsified ethylene polymer latices which are odorless and uniformly white in color. These latices have showed great promise when used to coat paper. Other latices of ethylene polymer which can be similarly used to coat paper are disclosed in pending U.S. applications Ser. No. 104,711; Ser. No. 197,234; and Ser. No. 198,769, now abandoned. Papers coated with these materials show excellent low rates of moisture vapor transmission, of the order of about 10 grams of water per square meter per 24 hour period, calculated for an ethylene polymer film thickness of 1 mil. These rates, however, are for flat or uncreased samples. When paper coated with the ethylene polymer is creased, there is an increase in the moisture vapor transmission rate (MVTR).

It has now been discovered that paper having improved MVTR (particularly as measured on creased samples) can be prepared by applying to the paper an emulsion-deposited coating of at least one ethylene polymer and at least one rubbery film-forming thermoplastic polymer. The coating can be laid down from a mixed emulsion containing the two polymer species or, alternatively, the paper can be sequentially and separately coated with emulsions of the two polymer species. In addition to improved MVTR, other benefits are often realized with paper bearing a coating formed from the two polymer species, e.g., frequently the coated papers have a unique combination of good MVTR, high gloss and freedom from tack.

The following examples, description and reference to the drawings are set forth to illustrate more clearly the principles and practice of this invention to those skilled in the art wherein in the drawings.

EXAMPLE 1

Figure 1:
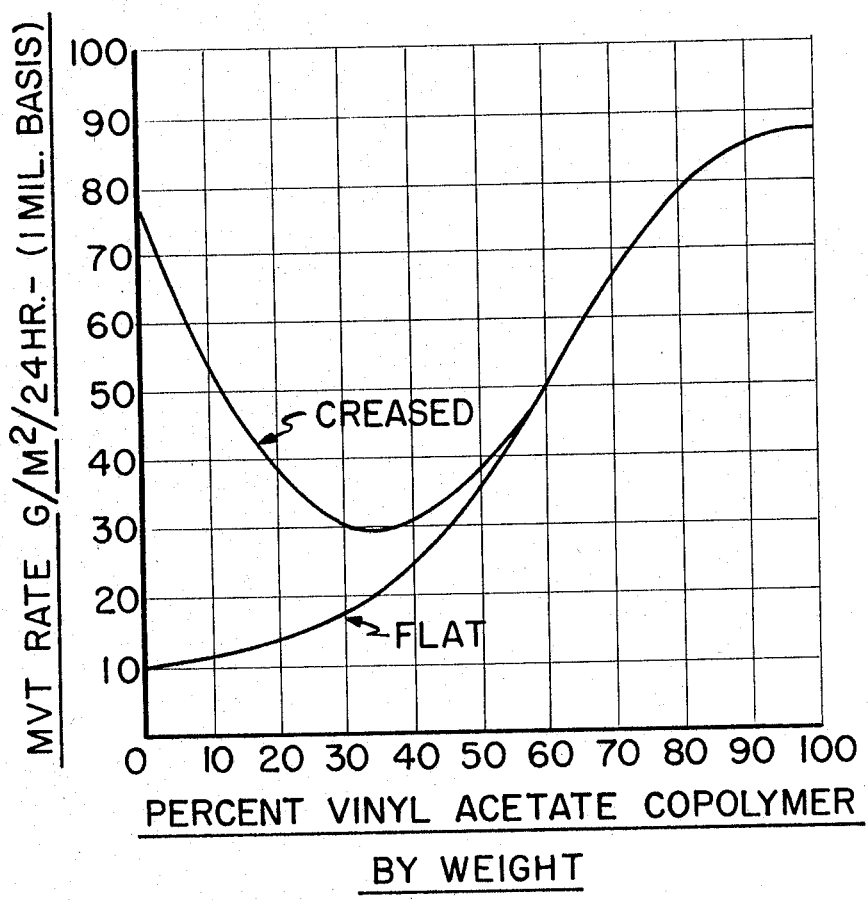
FIGURE 1 is a graph showing the effect of vinyl acetate/dibutyl fumarate copolymer concentration in blends with polyethylene on moisture vapor transmission of flat and creased paper samples coated with these blends.

A polyethylene latex was prepared by the emulsion polymerization of ethylene at 3000 lb./sq. in. pressure and 80–100° C. with 0.30 part of potassium persulfate as the initiator and 3 parts of an ethoxylated nonylphenol as emulsifier in an aqueous medium comprising 15 parts of t-butanol and 85 parts of water, as disclosed in French Patent 1,295,896. A latex containing 17.0 percent total solids was obtained, which was concentrated to about 40 percent total solids by distilling off the t-butanol and a portion of the water. A white, fluid product was obtained. A portion of the polymer, separated from the latex by coagulation with isopropanol, exhibited the following physical properties: inherent viscosity, 0.734 (determined using a 0.2% solution of polymer in tetrahydronaphthalene at 135° C.); density, 0.9294 g./ml.; melt index 8.3; color, white; odor, none.

Four sheets of bread wrap paper approximately 5 in. square were coated by applying about 2 ml. of latex diluted to 25 percent total solids to one edge of the paper and spreading the latex uniformly by drawing a wire-wound stainless steel rod across the sheet. Two layers were applied. After application of each layer the paper was dried in a circulating air oven for 5 minutes at 105–110° C.

Circular test specimens were cut from each sheet using a metal die. Each specimen was weighed and the average thickness of the coating was calculated from the known density of the polymer, the area of the sheet and the difference in weight from that of an uncoated specimen. Two of the specimens were creased by making two folds in a direction parallel to the machine direction of the sheet, one fold toward the coated side and one away from the coated side. Two similar folds were then made at right angles to the first two. The four specimens were set on top of weighed aluminum cups containing magnesium perchlorate as a desiccant and sealed around the edges with rubber gaskets and metal clamping rings. The test cups were placed in a humidity chamber at 75° F. and 80% relative humidity. Each cup was weighed after 24, 48, and 72 hours and the weight gain was used to calculate the rate of moisture vapor transmission in units of grams per square meter per 24 hours. The average of the three readings was computed and adjusted to a basis of 1 mil. film thickness. The following data were obtained:

| Specimen Number | Creasing Status | Average Moisture Vapor Transmission Rate, g./m.²/24 hr. (1 mil. basis) |
| --- | --- | --- |
| 1 | Flat | 11.7 |
| 2 | do | 10.1 |
| 3 | Creased | 73.2 |
| 4 | do | 84.1 |

EXAMPLE II

Part A

A polyethylene latex prepared by the process described in Example I except for using a lower potassium persulfate level (0.08 part) contained 17.6 percent total solids at the conclusion of the polymerization. The polymer had an inherent viscosity of 0.571 and a density of 0.9315 g./ml. Bread wrap paper specimens coated as described in Example I with two layers of the latex, after removal of t-butanol and dilution to 25 percent solids, gave the following values for moisture vapor transmission rate:

| Specimen Number | Creasing Status | Moisture Vapor Transmission Rate, g./m.$^2$/24 hour (1 mil. basis) |
|---|---|---|
| 1 | Creased | 61 |
| 2 | do | 85 |

Part B

A portion of the latex from Part A was blended with a vinyl acetate copolymer latex in a polymer ratio of 75:25 by the following procedure. A 26.2 g. portion of vinyl acetate-dibutyl fumarate copolymer latex containing 57.2 percent total solids was added to 115.0 g. of polyethylene latex containing 40 percent total solids. 58.8 g. of distilled water were added to the mixture. The components were thoroughly blended by means of a mechanical stirrer. The total solids content of the blend was 25 percent.

Test specimens were prepared from bread-wrap paper as described in Example I except that 3 coats were applied to obtain satisfactory film thickness. The results of the MVT tests were as follows:

| Specimen Number | Creasing Status | Moisture Vapor Transmission Rate, g./m.$^2$/24 hour (1 mil. basis) |
|---|---|---|
| 1 | Flat | 16 |
| 2 | do | 21 |
| 3 | Creased | 31 |
| 4 | do | 28 |

The vinyl acetate-dibutyl fumarate copolymer latex was a material commercially available as "Polyco 804." The latex has a pH of about 4.0–5.0, contains less than 0.5 percent free monomer, has a specific gravity of 1.10, and a viscosity of 1700–2300 c.p.s. (25° C., Brookfield LVF or RVT 2/30). Particle size is about 0.2–0.4 micron. The polymer solids had an inherent viscosity of 0.352 in tetralin at 135° C. at a concentration of 0.2 percent. This copolymer contains about 80% vinyl acetate and about 20% dibutyl fumarate.

Part C

A series of paper sheets were coated with latex blends containing varying portions of the same polyethylene and the same vinyl acetate-dibutyl fumarate copolymer. The attached FIGURE 1 shows the moisture vapor transmission rate through flat and creased paper samples as a function of the percent of the vinyl acetate copolymer in the mixed coating. As is evident from the drawing, coatings containing between about 5 to about 70 percent by weight of the vinyl acetate copolymer on creased specimens have an MVTR below about 65, which is significantly lower than the MVTR for either a coating of polyethylene alone or for a coating of the vinyl acetate copolymer alone. When the vinyl acetate copolymer constitutes between about 18 percent and about 53 percent by weight of the coating, the MVTR can be kept at a value below about 40. The best coated papers are obtained when the coating contains about 35 percent of the vinyl acetate copolymer, since a minimum in the MVTR curve for the creased samples appears at this value.

Although the incorporation of the vinyl acetate copolymer into the polyethylene film causes an increase in the MVTR for flat coated samples, as compared with flat samples coated with polyethylene alone, the improved moisture vapor transmission rates for the creased samples more than compensates for the change in value of the flat coated papers.

EXAMPLE III

Part A

A hydrolyzed copolymer of ethylene and methyl acrylate was prepared from a charge consisting of 20 parts of an 80/20 ethylene-methyl acrylate copolymer (prepared by the method of Belgian Patent 607,096), 90 parts of water, 0.64 part of sodium hydroxide and 27 parts of 28% ammonium hydroxide. The charge was heated in a sealed autoclave for 15 hours at a temperature of 210–217° C. The resulting product was a homogeneous polymer emulsion.

Part B

The emulsion prepared in Part A above was blended with the polyethylene emulsion described in Example I to provide two mixed latices containing 25% solids. The first emulsion contained 50% of polyethylene, whereas the second emulsion contained 75% of polyethylene. Bread-wrap paper was coated with the mixed emulsions as described in Example I, dried for five minutes at 105–110° C., and tested for MVTR by the method described in Example I. The results are set forth in Table I.

TABLE I

| Percent Polyethylene In Coating | MVTR Grams/Meter$^2$/24 Hours (1 mil. basis) | |
|---|---|---|
| | Flat | Creased |
| 50 | 15 | 16 |
| 75 | 14 | 20 |

Part C

Bread-wrap paper was coated with the same polymers, in the same ratio, and at the same total coating weight as described in Part B above. In this case, however, the paper sheets were sequentially coated with the emulsion of the hydrolyzed ethylene-methyl acrylate copolymer and then the polyethylene emulsion. MVTR results were measured and are set forth in Table II.

TABLE I

| Percent Polyethylene In Coating | MVTR Grams/Meter$^2$/24 Hours (1 mil. basis) | |
|---|---|---|
| | Flat | Creased |
| 50 | 8 | 9 |
| 75 | 8 | 11 |

Referring to Tables I and II above, it will be noted that with this coating system superior MVTR results are obtained when the paper is sequentially coated with the two polymer emulsions as compared with coating from a mixed emulsion.

EXAMPLE IV

Four specimens of bread-wrap paper of the type described in Example I were coated once with an emulsion of a rubbery butadiene-styrene copolymer (Dow Latex 762–W) that had been diluted to 25% total solids. The coating was dried for five minutes at 105° C. The paper was then coated with the polyethylene emulsion described in Example I, which emulsion had been adjusted to 25% total solids. The final coating was then dried for five minutes at 105° C.

Two of the specimens were creased as previously described and MVTR values were measured on all four specimens and are set forth below:

| Specimen Number | Creasing Status | Average Moisture Vapor Transmission Rate, g./m.²/24 hr. (1 mil. basis) |
|---|---|---|
| 1 | Flat | 28.5 |
| 2 | do | 28.9 |
| 3 | Creased | 28.7 |
| 4 | do | 27.6 |

It will be noted from the above table that the MVTR values on the creased samples were equivalent to the MVTR values on the flat or uncreased samples. This is a most unusual and beneficial phenomenon as can be seen by comparing the above data with the data set forth in Example I for paper sheets coated solely with the same polyethylene emulsion.

EXAMPLE V

The polyethylene emulsion described in Example I was blended with a commercially available butyl rubber latex (Enjay butyl latex 80–21) to prepare mixed emulsions which, on a solids basis, contained 5, 10, 15, 20, 25, 30 and 50% of butyl rubber solids. Bread-wrap paper of the type employed in Example I was given two coatings with each of the mixed emulsions, with a drying step being carried out after each coat. The coated specimens exhibited good gloss which is characteristic of coatings laid down with the polyethylene emulsion alone. By way of contrast, films laid down from the butyl rubber emulsions are quite dull. The films were not tacky and the coated sheets did not block when stored in stacked relationship under moderate pressure. As the butyl rubber content of the coating is increased, the gloss descreases slightly and the tack and tendency to block increase slightly. So long as the ethylene polymer constitutes at least 50% of the coating, however, the coated paper products will fully meet the requirements of the art. The MVTR values on creased samples were lower than the corresponding MVTR values obtained on creased samples bearing coatings laid down from the polyethylene emulsion.

EXAMPLE VI

Example IV is repeated except that the butadiene-styrene emulsion is replaced with the butyl rubber emulsion described in Example V. Comparable results are obtained.

The first polymer component used in the practice of the present invention is a thermoplastic ethylene polymer. Preferably, such ethylene polymers are prepared by emulsion polymerization processes as described in the patents and pending patent applications referred to in the fourth paragraph of this specification. The ethylene polymers most frequently employed in the practice of the invention are ethylene homopolymers. If desired, however, it is also feasible to employ ethylene copolymers in which at least 50% by weight of ethylene is copolymerized with up to 50% by weight of a copolymerizable vinylidene monomer of the formula:

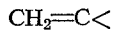

$$CH_2=C<$$

Typical examples of suitable comonomers include the vinyl halides, acrylic and methacrylic acids, esters of 1–18 carbon alcohols with acrylic and methacrylic acids, acrylonitrile, vinyl esters of 1–18 carbon atom fatty acids, e.g. vinyl acetate, styrene, etc., The ethylene polymers employed as the first polymer component ordinarily will have an elongation at break of less than about 100%.

The second polymer component used in the practice of the present invention is a rubbery film-forming thermoplastic polymer which has a film-forming temperature of less than about 50° C. and an elongation at break of at least about 150% and preferably at least about 200%.

The term "film-forming temperature" has a well established meaning in the art and can be determined by the method of Zdanowski and Brown (C.M.S.A. Proceeding of May 1958). The value is numerically virtually identical with the second order transition temperature. Scores of polymers fulfilling these requirements will be obvious to those skilled in the art. One preferred class of such rubbery film-forming thermoplastic polymers consists of copolymers of vinyl acetate with alkyl esters of fumaric and maleic acid, e.g., diethyl maleate, dibutyl fumarate, etc. Such copolymers will typically contain from 10–90% and preferably 60–90% of the vinyl acetate and, correspondingly, 90–10% and preferably 30–10% of the fumarate or maleate ester. Another preferred class of rubbery film-forming thermoplastic polymers consists of rubbery butadiene polymers e.g., butadiene homopolymers and butadiene copolymers consisting of at least 40% of butadiene copolymerized with less than 60% of a suitable comonomer such as styrene or acrylonitrile. Still another class of suitable polymers consists of the butyl rubbers, which are copolymers of at least 90% of isobutylene with less than 10% by weight of a conjugated 1,3-diene such as isoprene or butadiene e.g., a copolymer of 92–98% isobutylene and, correspondingly, 8–2% isoprene. Yet another preferred class of rubbery film-forming thermoplastic polymers consists of hydrolyzed ethylene-alkyl acrylate copolymers as disclosed in pending application Serial No. 131,108 which description is incorporated herein by reference. The initial unhydrolyzed ethylene-alkyl acrylate copolymer will contain from about 0.01 to about 0.50 mol of alkyl acrylate per mol of ethylene. The copolymer is hydrolyzed in the presence of caustic and optionally ammonia or an amine, with the hydrolysis being carried to the point that at least 10% of the alkyl acrylate moiety is hydrolyzed to carboxylate groups.

The two polymer components are employed in such proportions that, on a solid basis, the ethylene polymer constitutes 30–95 and preferably 40–75% of the final coating with the rubbery film-forming thermoplastic polymer constituting the balance. As will be apparent to those skilled in the art, the precise proportions of the two polymers to be employed will vary somewhat depending upon the polymer species employed, but in general, the ratios set forth immediately above will be eminently suitable to achieve the results herein described. Where mixed polymer latices are employed to coat the paper, they are ordinarily prepared by simply admixing the appropriate latex species. Ordinarily, each of the polymer latices will be initially prepared by an emulsion polymerization process, although in some cases, particularly in the case of the butyl rubbers, the polymer emulsions can be prepared from the solid polymers by methods known in the art. The terms "latex" and "polymer emulsions" are used herein in their conventional sense in which the medium in which the polymers are dispersed is water.

The methods employed to coat the paper are conventional except for the particular polymer emulsions employed in the process. The polymer emulsion is applied to the paper by any conventional method such as roll coating, knife coating, spraying, etc., and then dried, preferably at an elevated temperature, to evaporate the water and coalesce the polymer particles to form a continuous film on the paper substrate. When the paper is sequentially coated with the two polymer species, a drying step ordinarilly will be provided between the two coating steps.

Figure 2:
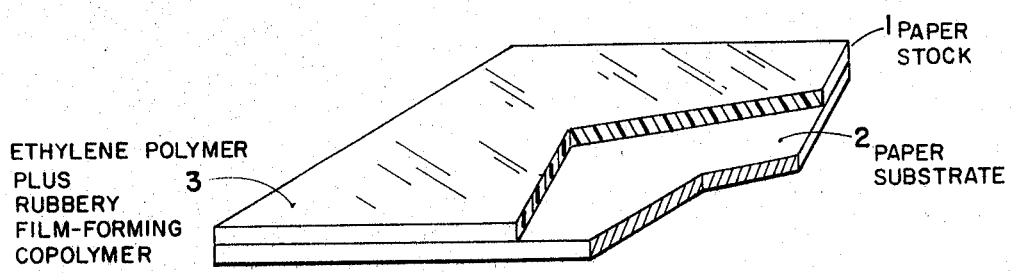
FIGURE 2 is an exaggerated perspective view, partly in section, illustrating one embodiment of this invention.
Figure 3:
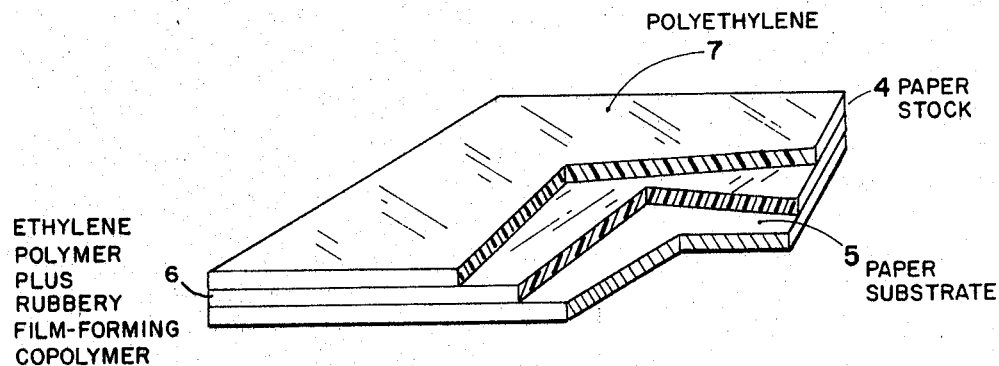
FIGURE 3 is an exaggerated perspective view, partly in section, of another embodiment in accordance with this invention.

As noted in Example III, with at least certain combinations of polymer species, somewhat better MVTR values are obtained by sequentially coating the paper with the two polymer species. Thus, as noted above, the coating can be laid down from a mixed emulsion containing the two polymer species or the paper can be sequentially and separately coated with emulsions of the two polymer species. The coating obtained by these methods of coating are illustrated in the drawings. As shown therein, FIGURE 2 illustrates a coated paper stock, generally indicated by the reference 2, wherein a paper substrate was coated from a blend of the two polymer species comprehended in this invention. The resultant paper stock 1 comprises a paper substrate 2 and a coating 3 applied from a mixed emulsion containing about 30 to 95% by weight of at least one ethylene polymer (as defined herein) and about 70–75% by weight of at least one rubbery film-forming thermoplastic polymer (as defined herein). FIGURE 3 illustrates a coated paper stock, indicated generally by the reference number 4, in which a paper substrate was sequentially and separately coated with emulsion of the two polymer species defined herein. A typical paper stock 4 coated in this way would comprise a paper substrate 5 having a coating 6 applied thereon from an emulsion of one of the polymer species of this invention, followed by a second sequential coating, on the first coat 6, of a second coating 7 which is applied from an emulsion of the other defined polymer species of this invention. With reference to Part C of Example III, the paper coated stock 4 would comprise a bread wrap paper stock 5, having a coating 6 of a hydrolyzed ethylene/methyl acrylate copolymer, and a top coating 7 of polyethylene applied on top of the first coating 6.

The paper to be coated can be any of a wide variety of types including kraft, bond, parchment, etc. The type, weight, and other physical properties of the paper to which the coating is applied do not significantly affect the improvement in MVTR brought about by the method of the invention.

Paper coated by the method of this invention with a mixture of an ethylene polymer and a butyl rubber are worthy of special note. The characteristics of paper emulsion coated solely with an ethylene polymer and the shortcomings thereof have been previously noted. Prior to the present invention, it was known that paper coated with the film laid down from a butyl emulsion rubber had excellent MVTR values. Such butyl rubber coated papers, however, suffered from two serious shortcomings. First, the butyl rubber coatings were tacky and the coated sheets tended to block. Second, the butyl rubber coatings were dull and had poor esthetic characteristics. It has been discovered that when coatings are laid down from mixed latices containing about 60–90 and preferably 75–85% polyethylene and the balance butyl rubber the resulting coated paper has all of the advantages associated with both polyethylene and butyl rubber coated papers and none of the shortcomings associated with either.

The coated papers provided by the present invention have utility for many purposes which will be obvious to those skilled in the art. In particular, the coated papers may be used to wrap food products where it is desired to prevent the transmission of moisture from the atmosphere to the packaged product. The coated papers are easily heat sealed and hold liquids well. As a result, such coated papers can be used in the manufacture of paper drinking cups and the like.

The above descriptions, and particularly the examples, are set forth for purposes of illustration only. Many variations and modifications thereof will be apparent to those skilled in the art and can be made without departing from the spirit and scope of the invention herein described.

What is claimed is:

1. A coated paper resistant to moisture vapor transmission and comprising a paper substrate having thereon an aqueous emulsion-deposited coating comprising about 30–95% by weight of at least one ethylene polymer and, correspondingly, about 70–5% by weight of at least one rubbery film-forming thermoplastic polymer which has a film-forming temperature of less than about 50° C. and an elongation at break of at least about 150%, said rubbery film-forming thermoplastic polymer being a member selected from the class consisting of (a) hydrolyzed copolymers of ethylene and an alkyl acrylate in which at least 10% by weight of the alkyl acrylate moiety has been hydrolyzed to carboxylate groups, (b) copolymers of butadiene with an effective concentration of acrylonitrile and containing at least 40% butadiene, (c) copolymers of isobutylene with a comonomer selected from the group consisting of butadiene and isoprene and containing between 92–98% isobutylene and 8–2% of said comonomer, and (d) copolymers of vinyl acetate with an alkyl ester of an acid selected from the group consisting of fumaric acid and maleic acid and containing a concentration of vinyl acetate in the range of 10–90%.

2. A coated paper of claim 1 in which the aqueous emulsion-deposited coating comprises about 40–75% by weight of the ethylene polymer and, correspondingly, about 60–25% by weight of the said rubbery film-forming thermoplastic polymer.

3. A coated paper of claim 1 in which the said ethylene polymer is an ethylene homopolymer.

4. A coated paper of claim 1 wherein the two polymers are present as separate superimposed coatings.

5. A method for preparing a paper containing thereon a coating comprising about 30–95 % by weight of at least one ethylene polymer and, correspondingly, about 70–5% by weight of at least one rubbery film-forming thermoplastic polymer as separate superimposed coatings which comprises applying to a paper surface an aqueous dispersion of a thermoplastic polymer and heating to coalesce said polymer to form a continuous polymer film on the paper and thereafter applying to the coated paper surface an aqueous dispersion of a different thermoplastic polymer and heating to coalesce said polymer to form a continuous polymer film; one of said aqueous dispersions being a dispersion of at least one ethylene polymer; the second of said aqueous dispersions being a dispersion of at least one rubbery film-forming thermoplastic polymer which has a film-forming temperature of less than about 50° C. and an elongation at break of at least 150°, said rubbery film-forming thermoplastic polymer being a member selected from the class consisting of (a) hydrolyzed copolymers of ethylene and an alkyl acrylate in which at least 10% by weight of the alkyl acrylate moiety has been hydrolyzed to carboxylate groups, (b) copolymers of butadiene with an effective concentration of acrylonitrile and containing at least 40% butadiene, (c) copolymers of isobutylene with a comonomer selected from the group consisting of butadiene and isoprene and containing between 92–98% isobutylene and 8–2% of said comonomer, and (d) copolymers of vinyl acetate within alkyl ester of an acid selected from the group consisting of fumaric acid and maleic acid and containing a concentration of vinyl acetate in the range of 10–90%.

6. A method for preparing a paper containing thereon a coating comprising about 30–95 % by weight of at least one ethylene polymer and, correspondingly, 70–5% by weight of at least one rubbery film-forming polymer which has a film-forming temperature of less than about 50° C. and elongation at break of at least about 150% which comprises applying to a paper surface an aqueous dispersion of a hydrolyzed copolymer of ethylene and an alkyl acrylate in which at least 10% by weight of the alkyl acrylate moiety has been hydrolyzed to carboxylate groups and heating to coalesce said polymer to form a continuous polymer film on the paper, and thereafter applying to the coated paper surface an aqueous dispersion of an ethylene polymer and heating to coalesce said ethylene polymer to form a continuous polymer film.

7. A coated paper resistant to moisture vapor transmission and comprising a paper substrate having thereon an aqueous emulsion-deposited coating comprising about 30–95% by weight of at least one ethylene polymer and, correspondingly, about 70–5% by weight of at least one rubbery film-forming thermoplastic polymer which has a film-forming temperature of less than about 50° C. and an elongation at break of at least about 150%, with said rubbery film-forming thermoplastic polymer being a hydrolyzed copolymer of ethylene and an alkyl acrylate in which at least 10% by weight of the alkyl acrylate moiety has been hydrolyzed to carboxylate groups.

8. A coated paper resistant to moisture vapor transmission and comprising a paper substrate having thereon an aqueous emulsion-deposited coating comprising about 30–95% by weight of at least one ethylene polymer and, correspondingly, 70–5% by weight of at least one rubbery film-forming polymer which has a film-forming temperature of less than about 50° C. and an elongation at break of at least about 150%, with said ethylene polymer and said rubbery film-forming thermoplastic polymer being present as separate superimposed coatings, and wherein the coating in immediate contact with the paper substrate is said rubbery film-forming thermoplastic polymer comprised of a hydrolyzed copolymer of ethylene and an alkyl acrylate in which at least 10% by weight of the alkyl acrylate moiety has been hydrolyzed to carboxylate groups.

References Cited by the Examiner
UNITED STATES PATENTS

| | | | |
|---|---|---|---|
| 2,369,471 | 2/1945 | Latham | 260—4 |
| 2,886,464 | 5/1959 | Van Dorn | 117—76 X |
| 2,953,551 | 9/1960 | White | 260—86.7 |
| 2,994,677 | 8/1961 | Bohnert et al. | 117—155 X |
| 3,026,241 | 3/1962 | Hechtman et al. | 117—155 X |
| 3,201,498 | 8/1965 | Brunson et al. | 117—155 X |
| 3,211,808 | 10/1965 | Young et al. | 117—155 X |

FOREIGN PATENTS

| | | |
|---|---|---|
| 836,988 | 1/1939 | France. |
| 678,279 | 9/1952 | Great Britain. |

MURRAY KATZ, *Primary Examiner.*

H. W. MYLIUS, *Assistant Examiner.*